United States Patent
Rapp et al.

(10) Patent No.: US 10,954,155 B2
(45) Date of Patent: Mar. 23, 2021

(54) COMPOSITION AND METHOD FOR PRODUCING A MOLDED BODY FROM A HIGHLY PURE, TRANSPARENT QUARTZ GLASS BY MEANS OF ADDITIVE MANUFACTURING

(71) Applicant: Karlsruher Institut Für Technologie, Karlsruhe (DE)

(72) Inventors: Bastian Rapp, Karlsruhe (DE); Frederik Kotz, Karlsruhe (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 51 days.

(21) Appl. No.: 16/339,802

(22) PCT Filed: Oct. 4, 2017

(86) PCT No.: PCT/EP2017/001169
§ 371 (c)(1),
(2) Date: Apr. 5, 2019

(87) PCT Pub. No.: WO2018/065093
PCT Pub. Date: Apr. 12, 2018

(65) Prior Publication Data
US 2020/0039868 A1    Feb. 6, 2020

(30) Foreign Application Priority Data

Oct. 6, 2016 (DE) ..................... 10 2016 012 003.7

(51) Int. Cl.
C03C 3/06 (2006.01)
C03B 19/06 (2006.01)
(Continued)

(52) U.S. Cl.
CPC .............. *C03C 3/06* (2013.01); *C03B 19/066* (2013.01); *B33Y 10/00* (2014.12); *B33Y 40/00* (2014.12);
(Continued)

(58) Field of Classification Search
CPC ..... C03C 3/06; C03C 2201/60; C03B 19/066; C03B 19/00; C03B 2201/42;
(Continued)

(56) References Cited

U.S. PATENT DOCUMENTS

| 4,849,001 A | 7/1989 | Drake et al. |
| 5,236,483 A | 8/1993 | Miyashita et al. |

(Continued)

FOREIGN PATENT DOCUMENTS

| DE | 3741393 A1 | 6/1989 |
| EP | 0 653 381 A1 | 4/1998 |

(Continued)

OTHER PUBLICATIONS

Kotz et al. Liquid Glass: A Facile Soft Replication Method for Structuring Glass. Adv. Mater. 2016, 28, 4646-4650.*
(Continued)

*Primary Examiner* — Noah S Wiese
(74) *Attorney, Agent, or Firm* — McDonnell Boehnen Hulbert & Berghoff LLP

(57) ABSTRACT

The present invention relates to a composition and a process for the production of a molding made of high-purity transparent quartz glass, by means of additive manufacturing.

20 Claims, 6 Drawing Sheets

(51) Int. Cl.
   B33Y 10/00    (2015.01)
   B33Y 40/00    (2020.01)
   B33Y 70/00    (2020.01)
   B33Y 80/00    (2015.01)
(52) U.S. Cl.
   CPC ............. *B33Y 70/00* (2014.12); *B33Y 80/00* (2014.12); *C03B 2201/42* (2013.01); *C03C 2201/60* (2013.01)
(58) Field of Classification Search
   CPC . C03B 2201/30; C03B 2201/40; B33Y 10/00; B33Y 70/00; B33Y 80/00; B29C 64/165
   See application file for complete search history.

(56) References Cited

U.S. PATENT DOCUMENTS

| | | | |
|---|---|---|---|
| 5,679,125 | A | 10/1997 | Hiraiwa et al. |
| 6,355,587 | B1 * | 3/2002 | Loxley .................. C03B 19/06 264/653 |
| 6,576,578 | B1 | 6/2003 | Ikuta et al. |
| 6,606,883 | B2 | 8/2003 | Hrdina et al. |
| 6,829,908 | B2 | 12/2004 | Bowden et al. |
| 8,991,211 | B1 | 3/2015 | Arlotti et al. |
| 2004/0118158 | A1 | 6/2004 | Schwertfeger et al. |
| 2006/0137398 | A1 | 6/2006 | Bleaking et al. |
| 2008/0196448 | A1 | 8/2008 | Borens et al. |
| 2010/0041538 | A1 | 2/2010 | Arai et al. |
| 2015/0224575 | A1 | 8/2015 | Hirata |
| 2015/0307385 | A1 | 10/2015 | Klein et al. |
| 2016/0083303 | A1 | 3/2016 | Mironets et al. |

FOREIGN PATENT DOCUMENTS

| | | |
|---|---|---|
| EP | 1 210 294 A1 | 5/2005 |
| EP | 2 452 965 A1 | 5/2012 |
| WO | 2006/005772 A1 | 1/2006 |
| WO | 2014/098956 A1 | 6/2014 |

OTHER PUBLICATIONS

Wozniak et al. Rheology of UV curable colloidal silica dispersions for rapid prototyping. Journal of the European Ceramic Society 31 (2011)2221-2229.*

International Search Report, from the European Patent Office, for International Patent Application PCT/EP2017/001169, dated Jan. 12, 2018, pp. 1-3.

German International Search Report, from the European Patent Office, for International Patent Application PCT/EP2017/001169, dated Jan. 12, 2018, pp. 1-5.

German Written Opinion, from the European Patent Office, for International Patent Application PCT/EP2017/001169, dated Jan. 12, 2018, pp. 1-6.

Kotz, F., et al., "Liquid Glass: A Facile Soft Replication Method for Structuring Glass", Advanced Materials, 2016, vol. 28, pp. 4646-4650, doi:10.1002/adma.201506089.

Luo, J., et al., "Additive Manufacturing of Glass", Journal of Manufacturing Science and Engineering, Oct. 24, 2014, vol. 136(6), 061024, pp. 1-6), Paper No. MANU-14-1247, doi:10.1115/1.4028531. (Abstract only).

Wozniak, M., et al., "Rheology of UV Curable Colloidal Silica Dispersions for Rapid Prototyping Applications", Journal of the European Ceramic Society, 2011, vol. 31, pp. 2221-2229.

Wozniak, M., et al., "Highly Loaded UV Curable Nanosilica Dispersions for Rapid Prototyping Applications", Journal of the European Ceramic Society, 2009, vol. 29, pp. 2259-2265.

Translation of the International Preliminary Report on Patentability and Written Opinion, from the International Bureau of WIPO, for PCT/EP2017/001169, dated Apr. 9, 2019, pp. 1-16.

Kotz, F., et al. "Three-Dimensional Printing of Transparent Fused Silica Glass", Nature, Apr. 20, 2017, vol. 544, pp. 337-342.

* cited by examiner a)  b)

COMPOSITION AND METHOD FOR PRODUCING A MOLDED BODY FROM A HIGHLY PURE, TRANSPARENT QUARTZ GLASS BY MEANS OF ADDITIVE MANUFACTURING

CROSS-REFERENCE

This application is a section 371 U.S. National phase of PCT/EP2017/001169, filed Oct. 4, 2017 which claims priority from German patent application no. 10 2016 012003.7, filed Oct. 6, 2016, both which are incorporated by reference in its entirety.

FIELD OF INVENTION

The present invention relates to a composition and a process for the production of a molding made of high-purity transparent quartz glass, by means of additive manufacture.

BACKGROUND OF THE INVENTION

When processes for the additive manufacture of three-dimensional structures are compared with conventional production processes, they have the advantage of requiring no prefabricated matrix that predetermines the geometry of the body to be manufactured. Because additive manufacture provides freely selectable three-dimensional shaping, it can comply with specific customer desires at low cost, and can also produce prototypes inexpensively and rapidly. Another expression used for the production processes applied in additive manufacture is therefore "rapid prototyping processes" (RP processes).

The additive manufacturing processes described in the prior art are mainly suitable for the production of polymer components. Exceptions are provided by approaches based on selective laser sintering, where it is also possible to use metallic and ceramic materials, for example aluminum oxide. As far as the production of freely structurable glass bodies is concerned, there is by way of example a known selective laser-sintering process which provides local melting of quartz glass nanoparticles in a powder bath and compaction of said particles to give a glass body, as described by way of example in US 2004/0118158 A1. However, disadvantageous aspects of the process are the high process temperatures required and the resultant plant requirements. That process moreover has only limited possibilities for free-form production of glass components, because significant shrinkage occurs during the manufacturing process and affects parts of the resultant glass component. The resultant glass moldings therefore exhibit severe local warpage, and also high intrinsic stresses. The surface quality of the glass components obtained by this process is moreover mostly unsatisfactory, because selective laser sintering leads to high roughness and therefore to low optical transparency.

Another approach to the additive manufacture of glass components is an RP process based on the process known as melt layering (fused deposition modeling, FDM). The FDM process modified for the production of glass components is described in US 2015/0307385 A1 and uses a glass strand instead of a polymeric filament as substrate. The glass strand is melted in a high-temperature nozzle and applied within the chamber. According to Luo et al. (Journal of Manufacturing Science and Engineering 2014, 136, 061024), the melting of the glass strand can also be achieved here by means of a laser. A three-dimensional glass structure is thus formed via controlled three-dimensional motion of the high-temperature nozzle, and finally the desired glass component is obtained after cooling. However, the original filament structure of the glass strand remains visible in the resultant glass molding. The resolution of detail achievable by the process described above is moreover subject to restriction, resulting in high surface roughness and therefore low surface quality.

Finally, the prior art also describes other processes for the production of glass moldings. There are also variations here in the description of the structuring of the glass molding. The processing of glass in this context is not infrequently restricted to high-temperature processes; large quantities of crystal-formers are added here to technical glasses in order to reduce melting temperatures. The high optical transmittance of these glasses, extending far into the UV region, this being a known property of quartz glasses, is thus mostly lost.

US 2015/0224575 A1 describes a 3D printing process which uses a mixed thermoplastic matrix. This consists of two components amenable to thermal removal and, respectively, decomposition at different temperatures. The procedure here is based on the provision of an organic binder in the form of a thermoplastic which is selectively treated with photo-curing ink, with a resultant possibility of local structuring. A disadvantageous aspect of this process is the fact that a very complex binder system is required (i.e. at least two thermoplastics are required in addition to the UV-curing ink), and that the disadvantages associated with traditional 3D printing are still present, for example high roughness and poor optical transmittance. The optical and mechanical quality of the resultant substrates is therefore low.

One of the few methods of using a powder-based approach for production of transparent glasses is described in U.S. Pat. No. 6,829,908. However, in order to achieve adequate densities here, the glass body must be exposed to pressure during sintering; this renders free shaping almost impossible. The thermal treatment here must also be carried out in a controlled atmosphere, for example under hydrogen, as described in U.S. Pat. No. 6,576,578, or in dried reactive gases, as described in U.S. Pat. No. 5,679,125. U.S. Pat. No. 4,849,001 moreover describes a process modification of this approach. An organic binder matrix is additionally used here.

Zone-melting processes are described in the prior art for the production of components of high optical purity, for example in US 2016/0083303 A1. Those processes permit production of high-purity components with high optical transmittance, but they are restricted to relatively simple geometric structures. The reason for this is found in the nature of the process: In zone-melting, regions of the component are selectively liquified in order to utilize the different solubility of foreign atoms in the solid and, respectively, in the liquid state. However, the component suffers local loss of its mechanical strength due to the partial conversion to liquid, with resultant collapse of the filigree structures. In terms of comparative technology, zone-melting is moreover a very complicated process.

The prior art also discloses in principle powder-based processes with use of methods such as 3D printing. U.S. Pat. No. 8,991,211 may be mentioned as an example here. During the sintering procedure, the components produced require support in an inert powder so that they do not lose their shape. These approaches are mostly described only for soda-lime glasses, and are therefore not suitable for the production of transparent quartz glasses.

Although the prior art discloses processes which can produce glasses of high optical quality, these are not suitable for free shaping in three dimensions. Examples here can be found in US 2010/0041538 A1 and US 2006/0137398 A1. Wozniak et al. (Journal of the European Ceramic Society 2009, 29, 2259-2265) moreover describe a powder-based approach which uses replication to provide the production of a milky-opaque glass component with use of a photo-curable organic binder matrix. Similarly, Kotz et al. (Advanced Materials 2016, 28, 4646-4650) describe a process which can produce quartz glass of high optical purity. However, both abovementioned processes are of replicative type, and are therefore not suitable for the free shaping of quartz glass in three dimensions.

The prior art describes a variety of approaches to the production of quartz glass particles and compaction of same to give transparent glasses. Suitable production processes here are mostly based on flame hydrolysis, for example as described in U.S. Pat. No. 6,606,883. However, such processes do not permit free shaping.

US 2008/0196448 A1, EP 0 653 381 A1 and EP 1 210 294 A1 respectively describe a process which produces a slurry of quartz glass particles and water which is poured into a suitable mold and then is molded. After extraction of the water, the resultant unsintered body can be sintered. However, the process does not permit free shaping in three dimensions, and the slurry is not directly structurable. The process therefore involves a casting method which is not suitable for an RP process.

Sol-gel approaches using $SiO_2$ precursors (alkoxy- or chlorosilanes) provide another important group of methods for the production of high-purity quartz glass. The precursors are condensed here, and the by-products arising during the condensation—often a salt, alcohol, hydrochloric acid (HCl) or water—are extracted. These approaches mostly involve considerable shrinkage, since large mass fractions are removed from the solution. The resultant glass components often have low density, due to the porous cavitated structure. The components also mostly fail to achieve the optical, and especially also mechanical, properties known from quartz glass. Sintering at very high temperatures in the range from 1500 to 2200° C. is often necessary in order that the glasses have adequate density, and also appropriate mechanical and optical properties. U.S. Pat. No. 5,236,483 describes examples of this type of sol-gel approach.

A factor common to the abovementioned processes is therefore that they are not suitable for the production of quartz glass bodies freely shaped in three dimensions with high structural resolution together with high optical and mechanical quality. No success has hitherto been achieved with production of high-purity transparent quartz glass moldings in the context of an additive manufacturing process.

SUMMARY OF THE INVENTION

It is therefore an object of the present invention to provide an additive manufacturing process intended to permit the production of a body freely shaped in three dimensions made of high-purity transparent quartz glass with high structural resolution to give high optical and mechanical quality.

Said object is achieved via the embodiments of the present invention which are characterized in the claims.

DETAILED DESCRIPTION OF THE INVENTION

Figure 1:
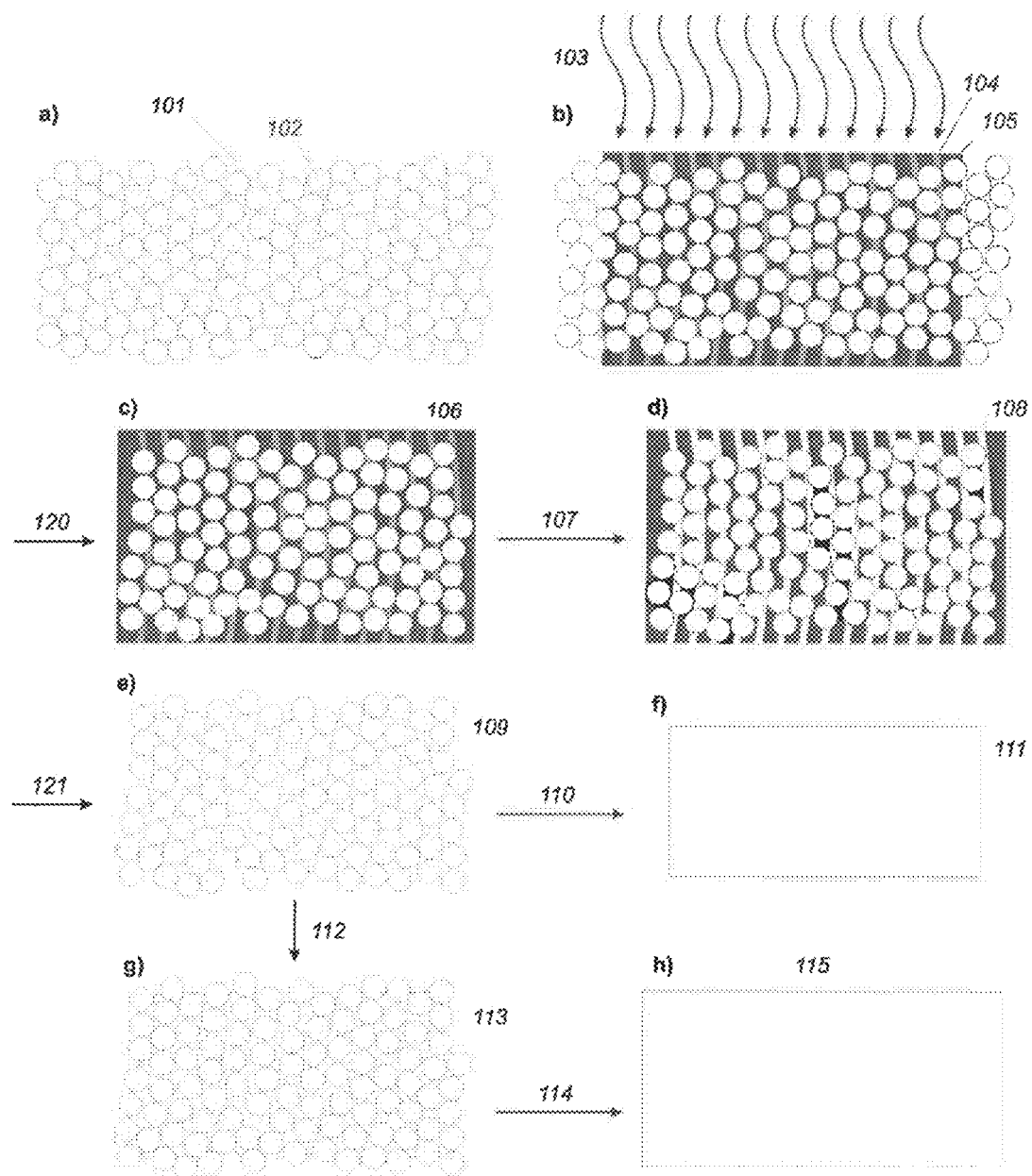
FIG. 1 is a diagram of the process of the invention: (a) polymerizable organic binder (101) with quartz glass particles (102) dispersed therein, (b) structured irradiation, i.e. spatially restricted supply of light (103) permits spatially resolved hardening of the at least one polymerizable organic binder, there being mixed phases of the non-hardenable component (104) present in the hardened binder matrix (105), (c) separation (120) of the non-hardened organic binder gives the final green part (106), (d) removal (107) of the non-hardenable component from the green part produces cavities (108), (e) thermal decomposition (121) of the hardened organic binder produces the brown part (109), (f) this can now be compacted by sintering (110) of the final molding (111), (g) or else the cavities thereof can be filled by a suitable process (112) in order to modify the optical and/or mechanical and/or thermal properties of the final molding, and/or in order to achieve infilling (113) of the brown part before sintering, (h) the final molding (115) produced from the post-treated brown part by means of a changed sintering procedure (114) exhibits reduced shrinkage and/or specifically modified properties.

In particular, the invention provides a composition and a process for the production of a molding made of high-purity transparent quartz glass, where the composition of the invention comprises the following components:
at least one polymerizable organic binder which at room temperature is present in liquid form;
a polymerization initiator or crosslinking agent, respectively, which, via supply of light or heat, initiates the polymerization or crosslinking of the at least one polymerizable organic binder; and
at least one type of spherical quartz glass particles, which are present in dispersed form in the at least one polymerizable organic binder and have a diameter in the range from 7 to 100 nm.

The at least one polymerizable organic binder is present in liquid form at room temperature (20° C.). Presence in liquid form in this context means that the at least one polymerizable organic binder either has a liquid physical state or has been dissolved in a suitable organic solvent. Solvents that can be used here are by way of example aliphatic alcohols, ketones, ethers, dimethylformamide and comparable solvents known to the person skilled in the art. The at least one polymerizable organic binder can be hardened by polymerization or crosslinking via supply of light or heat, thus giving a solid binder matrix. Accordingly, the at least one polymerizable organic binder possesses suitable functional groups accessible to a polymerization reaction. Such functional groups also include double bonds. The at least one polymerizable organic binder moreover has the property that, in the hardened state, it can be decomposed at elevated temperature, typically in the range from 200 to 700° C. In other respects, the at least one polymerizable organic binder is not subject to any further restrictions in the invention.

The at least one polymerizable organic binder in the present invention preferably includes those organic compounds that give thermoplastics via polymerization. In one embodiment of the present invention, the at least one polymerizable organic binder comprises those monomers which do not produce crosslinked polymers or, respectively, copolymers. Among these are, without restriction, polyolefins such as polyethylene, polypropylene, polystyrene, polyvinyl chloride, polymethyl methacrylate, polyhydroxymethyl methacrylate, polyhydroxymethyl acrylate, polyhydroxyethyl methacrylate, polyhydroxyethyl acrylate, polyhydroxypropyl methacrylate, polyhydroxypropyl acrylate, polyhydroxybutyl methacrylate, polyhydroxybutyl acrylate and acrylonitrile-butadiene-styrene, polycarbonates, polyesters such as polylactate and polyethylene terephthalate, polyamides, polyurethanes, polyetherketones, for example polyetheretherketone, polyethers and polyarylates. Accordingly, the at least one polymerizable organic binder can also consist of a plurality of monomer components.

In one embodiment of the present invention, the at least one polymerizable organic binder is a monomer having at least one polymerizable functional group, for example a monoacrylate and/or a diacrylate with any desired functionalization. If the composition for the production of a molding made of high-purity transparent quartz glass comprises both a monoacrylate and a diacrylate, and alternatively also a tri-, tetra-, penta-, hexa-, hepta- or octaacrylate and/or a comparable monomer with a plurality of polymerizable functional groups, as at least one polymerizable organic binder, the extent of crosslinking reactions in the hardened binder matrix can be controlled by adjusting the molar quantity proportions thereof.

The composition of the invention comprises, alongside the at least one polymerizable organic binder, a polymerization initiator or crosslinking agent, respectively, which, via supply of light or heat, initiates the polymerization or crosslinking of the at least one polymerizable organic binder.

The polymerization initiator and the crosslinking agent are not subject to any particular restriction in the invention. The composition defined above can comprise any desired, preferably commercially obtainable, polymerization initiator or crosslinking agent, respectively, as long as it can, via photolytic or thermolytic cleavage, produce molecules that induce polymerization or that induce crosslinking. Examples of polymerization initiators or crosslinking agents in the form of free-radical initiators activatable by means of light are azobis(isobutyronitrile) and benzoyl peroxide, whereas by way of example 2,2-dimethoxy-2-phenylacetophenone, phenylbis(2,4,6-trim ethylbenzoyl)phosphine oxide, 2-hydroxy-4'-(2-hydroxyethoxy)-2-methylpropiophenone and 2-hydroxy-2-methylpropiophenone are free-radicals amenable to thermal activation. Because the supply of light can be spatially limited more precisely than the supply of heat, the composition of the invention preferably comprises a light-activatable polymerization initiator or crosslinking agent, respectively. It is thus possible to achieve spatially resolved hardening of the at least one polymerizable organic binder present in the composition. The wavelength and/or temperature required for the photolytic and/or thermolytic cleavage of the polymerization initiator or crosslinking agent, respectively, can be found in the prior art, in particular in the case of commercially obtainable polymerization initiators or crosslinking agents.

The composition of the invention for the production of a molding made of high-purity transparent quartz glass moreover comprises at least one type of spherical quartz glass particles, the diameter of which is in the range from 7 to 100 nm, and which are present in dispersed form in the at least one polymerizable organic binder that is liquid at room temperature. The spherical quartz glass particles present in the composition of the invention consist of high-purity amorphous silicon dioxide, i.e. the $SiO_2$ mass fraction in the quartz glass particles is at least, or 90%, preferably at least, or 99%, and particularly preferably at least, or 99.9%. The term "spherical" is to be interpreted in this context as also including quartz glass particles with sphere-like geometric shape, i.e. quartz glass particles that are spheroidal. The diameter range defined above means here that there is in essence no dimension in which the diameter of the quartz glass particles is smaller than 7 nm or greater than 100 nm.

The composition of the invention for the production of a molding made of high-purity transparent quartz glass can moreover also comprise further components. In one preferred embodiment of the present invention, the composition comprises a non-hardenable component which is present as mixed phase in the binder matrix after the hardening of the at least one polymerizable organic binder. The expression non-hardenable component in the invention means substances which cannot be polymerized via the supply of light or heat, and also have adequate viscosity, their viscosity therefore being at least, or 5 mPa·s, preferably at least, or 15 mPa·s, and particularly preferably at least, or 25 mPa·s at room temperature, measured in accordance with DIN 53019. The non-hardenable component in the invention is accordingly present in solid form or in viscous liquid form. In other respects, the chemical nature of the non-hardenable component is not subject to any further restrictions.

Examples of the non-hardenable component are alcohols, ethers, silicone oils and comparable organic solvents and combinations thereof, where these have sufficiently high molecular weight and/or appropriate functionalizations in order to comply with the abovementioned viscosity. In another preferred embodiment, the non-hardenable component is an alkyl aryl ether which optionally has a functionalizing hydroxy group, for example ethylene glycol monophenyl ether. The viscosity of the substituted alkyl aryl ether also termed phenoxyethanol is 30 mPa·s at 20° C., and it therefore takes the form of viscous liquid at room temperature. Alternatively, the non-hardenable component can be present in solid form at room temperature. The viscosity of solids is generally very high. If the composition of the invention comprises a non-hardenable component in solid form, it must be assumed that its viscosity is at least, or 5 mPa·s. In one embodiment of the present invention, the non-hardenable component in the form of a solid is soluble in the at least one polymerizable organic binder. The non-hardenable component in the invention moreover has the property that it can be removed from the binder matrix after hardening of the at least one polymerizable organic binder. The removal can by way of example be achieved through a thermal treatment, whereupon the non-hardenable component either evaporates or sublimes, or alternatively is decomposed. By way of example, phenoxyethanol can be evaporated at 242° C. under atmospheric pressure, while by virtue of the vapor pressure significant quantities thereof are already removed at temperatures starting at 150° C.

The composition of the invention optionally comprises an absorber as further component. The absorber provides spatial delimitation of the polymerization or crosslinking, induced by the exposure to light or heat, of the at least one polymerizable organic binder. The basis of the underlying mechanism here is that the absorber limits or reduces the spatial extent of the chemical reaction leading to the polymerization or crosslinking. The chemical reaction can therefore take place only in those regions of the at least one polymerizable organic binder that have direct exposure to the light or heat. In these regions, the effective supply of light or heat is sufficient to permit initiation of a chemical reaction by the polymerization initiator or crosslinking agent, and maintenance of said reaction. In those regions of the at least one polymerizable organic binder that have no, or no direct, exposure to the light or heat, the rate of inhibition of the chemical reaction due to the absorption of light or heat by the absorber is greater than the rate of the initiation of new chemical reactions. In those regions, therefore, the chemical reactions cause no, or very much less, hardening of the at least one polymerizable organic binder.

In another embodiment of the present invention, the composition defined above comprises at least one second type of spherical quartz glass particles. The diameter of these is significantly greater than that of the first type of spherical quartz glass particles, and is in the range from 2 to 40 μm. Presence of at least one second type of spherical quartz glass particles with the abovementioned diameter range achieves denser packing, because the quartz glass particles with the smaller diameter now fill the interstices between the quartz glass particles with the greater diameter. All of the definitions and restrictions mentioned for the spherical quartz glass particles with diameter in the range from 7 to 100 nm also apply analogously to the spherical quartz glass particles with diameter in the range from 2 to 40 μm. In particular, the second type of spherical quartz glass particles also consists of high-purity amorphous silicon dioxide, i.e. the $SiO_2$ mass fraction in the quartz glass particles is at least, or 90%, preferably at least, or 99%, and particularly preferably at least, or 99.9%. The term "spherical" is to be interpreted in this context as also including quartz glass particles with sphere-like geometric shape, i.e. quartz glass particles that are spheroidal. The diameter range defined above means here that there is in essence no dimension in which the diameter of the quartz glass particles is smaller than 2 μm or greater than 40 μm.

Another aspect of the present invention provides a process for the production of a molding made of high-purity transparent quartz glass with the use of the composition of the invention in the context of additive manufacturing, for example 3D printing, where the process comprises the following steps, preferably in this sequence:

(a) providing the above characterized composition of the invention for the production of a molding made of high-purity transparent quartz glass in a device;
(b) hardening the at least one polymerizable organic binder contained in the composition via supply of light or heat, whereby a green part is obtained as primary structure;
(c) separating the potentially non-hardened at least one polymerizable organic binder, inclusive of the components contained therein, from the primary structure; and optionally at least once repeating the steps (a), (b) and optionally (c);
(d) optionally post-treating the primary structure by at least one process selected from the group consisting of structuring by means of a forming tool, irradiating with high-energy radiation and subsequent developing, milling, drilling, laminating, bonding, grinding, polishing, lapping, engraving and treating with heat or laser light;
(e) removing the non-hardenable component potentially present in the primary structure;
(f) debinding the primary structure by thermal treatment, whereby a brown part is obtained as porous secondary structure;
(g) optionally filling up the porous secondary structure with at least one filler; and
(h) sintering the porous secondary structure, whereby the final molding is obtained.

The process of the invention with use of the composition of the invention permits provision of a freely shaped body which is made of high-purity transparent quartz glass and which overcomes the disadvantages, disclosed in the prior art, of the additive manufacture of quartz glass moldings. In particular, the process of the invention permits production of a molding which is made of high-purity transparent quartz glass and which exhibits not only high structural resolution but also high optical and mechanical quality.

In particular, the process of the invention with use of the composition of the invention also permits production of filigree quartz glass structures that were not hitherto obtainable by the RP processes described in the prior art.

The steps (a) to (h), listed above, of the process of the invention are characterized here as follows:

In step (a) of the process defined above, the composition of the invention which permits production of a molding made of high-purity transparent quartz glass is provided or, respectively, arranged in a device. The present invention imposes no restrictions on the device. By way of example, the device can be a plate, a trough, a fluid chamber, a storage container, a piping system or duct system, an elastic pouch or tube, or else a comparably shaped article for the storage of a liquid, for example a glass beaker. In one embodiment of the present invention, the composition is not provided in a suitable vessel but instead retains shape by virtue of the intrinsic surface tension of the components, for example the shape of a droplet or of a film. It is also possible to use a rigid geometric shaped article as device. Said article comprises a cavity structure which corresponds to the shape of the glass component to be produced, and can therefore be used in a replicative process as described at a later stage below.

In another embodiment, which corresponds to a modification termed "lost form molding" of the process of the invention, the device additionally comprises a molding insert consisting of a solid or of a liquid with defined physical structure. In the case of a solid, the molding insert can by way of example be produced by means of 3D printing or stereolithography. If a liquid is used as molding insert, this is applied into the at least one polymerizable organic binder, for example with the aid of a syringe. Compact shape of the resultant liquid droplet is retained here by virtue of its surface tension, thus providing what may be termed a "floating" structure within the at least one polymerizable organic binder. It is thus possible to produce droplet-shaped cavity structures; this is in particular of interest for the production of decorative products. Accordingly, the solid or the liquid of the molding insert is not miscible with the at least one polymerizable organic binder. The manner in which the composition of the invention is provided or, respectively, arranged in step (a) in a device comprising the molding insert described above is such that the composition at least to some extent encapsulates said insert. The process of the invention thus finally provides a quartz glass molding with a macroscopic cavity which has the shape of the molding insert.

In step (b) of the process of the invention, the at least one polymerizable organic binder contained in the composition provided in step (a) in the device is hardened, whereby a green part is obtained as primary structure. The hardening of the at least one polymerizable organic binder is achieved either via supply of light or via supply of heat, as required by the nature of the polymerization initiator or crosslinking agent, preferably via supply of light, because this method permits hardening with higher structural resolution. The wavelength and, respectively, temperature required for the photolytic or thermolytic cleavage naturally depends on the respective polymerization initiator or crosslinking agent and, as mentioned above, can be found in the prior art.

The primary structure obtained in step (b) therefore comprises a solid binder matrix made of the hardened at least one polymerizable organic binder and, dispersed therein, comprises the at least one type of spherical quartz glass particles with a diameter in the range from 7 to 100 nm. The primary structure can moreover comprise further components which are optionally present in the composition provided in step (a), for example a non-hardenable component, a second type of spherical quartz glass particles, and an absorber, as described above.

The hardening of the at least one polymerizable organic binder provided with the composition takes place completely or incompletely in step (b). Incomplete hardening can be achieved via spatially restricted supply of heat or light, preferably light. The spatial resolution achievable during the irradiation with light correlates here with the beam profile of the light source used. The smaller the beam diameter thereof, the higher the possible resolution of the contours of the primary structure. In a preferred embodiment of the process of the invention, hardening of the at least one polymerizable organic binder is therefore achieved by using a laser light source or high-resolution lithography with use of a mask or of a dynamic light modulator, for example a micromirror array system.

If spatial resolution is of only subordinate importance, hardening can be carried out completely in step (b). In this case, the hardening of the at least one polymerizable organic binder can also preferably be achieved via supply of heat. Complete hardening is achieved by way of example in a device with rigid geometric shape, as described above, and the shaping of the primary structure is influenced here specifically by said rigid geometric shape and not by spatially restricted supply of an external stimulus such as light or heat. Hardening via supply of heat here indeed has the advantage that it is possible to harden the entirety of the at least one polymerizable organic binder, for example by heating the device.

In step (c) of the process of the invention, the potentially non-hardened at least one polymerizable organic binder, inclusive of the components contained therein, is separated from the primary structure. The separation can by way of example be achieved via a solvent treatment. However, the separation of the non-hardened at least one polymerizable organic binder is not restricted to a particular method. The separation can by way of example also be achieved by means of reduced pressure or by evaporation resulting from a temperature increase.

The steps (a) to (c) of the process of the invention are optionally repeated at least once, preferably more than once. The primary structure is thus successively expanded in each addition cycle until the desired molding is obtained. To this end, in each repetition cycle, the composition of the invention is suitably provided or, respectively, arranged in the device together with the primary structure obtained from the previous repetition cycle. This is followed by, as described above, hardening and removal of the potentially non-hardened at least one polymerizable organic binder together with the other composition components contained therein. If the steps (a) to (c) are repeated at least once, it is preferable that the hardening of the at least one polymerizable organic binder is achieved through light, in order to ensure appropriately high structural resolution. The structural resolution can be adjusted to meet the requirements of the quartz glass molding to be produced by adjusting the quantity of the composition charged or used in step (a) of the process of the invention. If very high structural resolution is required, only a small quantity of the composition defined above is provided in step (a) and hardened in step (b). If, in contrast, structural resolution is of subordinate importance, a large quantity of the composition can be provided in step (a) and hardened in step (b); the number of repetition cycles can thus be reduced accordingly, and production of the molding thus requires less time.

It is not essential in the invention that step (c) is implemented in every repetition cycle. If the non-hardened at least one polymerizable organic binder is not separated, it is thus directly provided or, respectively, arranged in step (a) for subsequent structuring in step (b). This is in particular advantageous when the intention is to produce a three-dimensional component in layered arrangement by what is known as the "bath method". This configuration is known by way of example from stereolithography. In this embodiment, omission of the step (c) of the iteration n to a certain extent replaces the step (a) of the iteration n+1, where n represents the respective repetition cycle.

As required by the nature of the hardening procedure, via supply of light or via supply of heat, the person skilled in the art will select, in the composition of the invention, a suitable polymerization initiator or crosslinking agent known in the prior art, and use the same in the process of the invention.

After optional repetition of the steps (a) to (c) at least once, the resultant primary structure is optionally post-treated by a suitable process in step (d). A post-treatment, in particular a mechanical post-treatment, is possible because the primary structure in essence consists of the binder matrix, i.e. of the hardened at least one polymerizable organic binder. The post-treatment methods that can be used in step (d) are not subject to any particular restrictions in the invention. In a preferred embodiment of the present invention, the post-treatment is achieved by at least one process selected from the group consisting of structuring by means of a forming tool, irradiating with high-energy radiation and subsequent developing, milling, drilling, laminating, bonding, grinding, polishing, lapping, engraving and treating with heat or laser light. It is also possible to use any other type of additive or subtractive surface treatment.

This type of post-treatment is advisable in particular when the primary structure has visible artefacts or other undesired surface defects which by way of example are attributable to the device used. If the device used has a rigid geometric shape, as described above, every unevenness of the relevant surface thereof is replicated in the primary structure.

In one embodiment, termed "polymer replication", of the process of the invention, the post-treatment in step (d) is achieved with the aid of a forming tool which serves for the structuring of the primary structure. The forming tool represents a suitably structured substrate which by way of example can be installed in a nanoimprint system. The structuring of the primary structure with use of the forming tool is optionally achieved with simultaneous supply of heat, in order to assist the transfer of the structure to the binder matrix. The sintering in step (h) thus gives a quartz glass molding which reflects the structure of the forming tool.

In another embodiment, termed "positive resist", of the present invention, the post-treatment of the primary structure is achieved in step (d) via irradiation with high-energy radiation and subsequent developing. The primary structure is exposed here to high-energy radiation (electron beam, ion beam, X-ray, etc.) in a manner that provides spatial resolution; chemical and/or physical properties are thus modified in the irradiated regions of the binder matrix of the primary structure in a manner such that said regions become soluble in a suitable solvent and can finally be developed, i.e. separated. Another possibility, instead of use of a solvent, is development of the irradiated regions by exposure to heat or by application of a reduced pressure. The result is similar to that in the "polymer replication" process modification described above in that sintering in step (h) gives a quartz glass molding which has appropriate structuring in the regions post-treated in step (d).

In step (e) of the process of the invention, the non-hardenable component potentially present as mixed phase in the primary structure is removed; whereby cavities are produced in the primary structure. Removal of the non-hardenable component can by way of example be carried out by a thermal treatment. The temperature range to be used here depends on the boiling point or sublimation point, or else on the decomposition point of the non-hardenable component. The temperature of this type of thermal treatment in step (e) is typically in the range from 50 to 300° C., a preferred temperature range here being from 100 to 250° C. The duration of this type of thermal treatment in step (e) is not subject to any particular restriction, and depends only on the dimensions of the primary structure and on the quantity of the non-hardenable component present in the composition. The duration of the thermal treatment in step (e), insofar as a non-hardenable component is present, is typically from 2 to 6 hours. The heating rate is not subject to any restrictions here. It is typically in the range from 0.4 to 0.6 K/min, for example being 0.5 K/min. A suitable thermal treatment in step (e) can moreover also be implemented via stepwise temperature increase. Alternatively, the non-hardenable component can also be removed by extraction with use of solvents. It is likewise possible to remove the non-hardenable component in vacuo, i.e. with application of reduced pressure.

Via thermal treatment, the primary structure is then debound in step (f), i.e. the hardened at least one polymerizable organic binder is removed. At a sufficiently high temperature, i.e. a temperature higher than in step (e), pyrolytic decomposition of the binder matrix takes place. The gaseous decomposition products here escape from the primary structure. If the composition of the invention comprises a non-hardenable component which is removed in step (e), escape of the decomposition products of the binder matrix from the primary structure, which is to be debound, can take place rapidly and efficiently through the cavities arising in step (e). In other cases, i.e. in the absence of the cavities produced by the non-hardenable component, gas transport from the interior of the primary structure in step (f) is less easy. This could result in cracking of the primary structure caused by insufficiently rapid diffusion, out of the interior of the primary structure, of the gaseous decomposition products arising from the binder matrix during pyrolysis. Via debinding the primary structure, a brown part is finally obtained as porous secondary structure. The porous secondary structure consists of high-purity quartz glass, and has a large number of cavities. The cavities here have homogeneous distribution throughout the porous secondary structure, and are present at all locations where the binder matrix and optionally the non-hardenable component were present as mixed phase. The quartz glass particles present in the composition of the invention are present at spatially defined positions in the porous secondary structure. If the composition of the invention comprises two different types of spherical quartz glass particles, a brown part with increased density can be obtained, because the interstices between one of the types of quartz glass particles have been filled by the quartz glass particles of the other type. This results in less shrinkage of the porous secondary structure during the sintering in step (h).

The thermal treatment in step (f) is not subject to any particular restriction, and preferably follows step (e) directly. Accordingly, if a thermal treatment for the removal of the non-hardenable component is carried out in step (e), it is preferable that no cooling to room temperature takes place before the step (f) is carried out. The temperature of the thermal treatment in step (f) is typically in the range from 200 to 700° C., and as mentioned above the temperature in step (f) is higher than the temperature in step (e). In a preferred embodiment of the present invention, the temperature in step (f) is in the range from 250 to 600° C. The duration of the thermal treatment in step (f) is not subject to any particular restriction, and depends only on the dimensions of the primary structure and consequently on the quantity of the organic binder to be decomposed. The duration of the thermal treatment in step (f) is typically from 3 to 9 hours. The heating rate here is not subject to any restrictions in the invention. It is typically in the range from 0.2 to 5 K/min, for example 0.5 K/min, 1.0 K/min or 2.5 K/min. The thermal treatment in step (f) can moreover also be implemented via stepwise temperature increase. After complete debinding, the resultant porous secondary structure can be cooled to room temperature, but this is not essential. It can also be directly sintered in step (h). If the porous secondary structure is to be cooled to room temperature, this can by way of example be achieved at a cooling rate of 5 K/min. A comparatively high cooling rate can be selected here because quartz glass has a low coefficient of thermal expansion, and also high thermal shock resistance.

As mentioned above, the steps (e) and (f) of the process of the invention can be carried out directly in succession without cooling therebetween. Accordingly, it is not necessary that there is a clearly defined boundary between removing the non-hardenable component, if the same is present and is removed by a thermal treatment, and removing the binder matrix, i.e. debinding the primary structure.

If the device comprises a molding insert, as is the case in the process modification termed "lost form molding", this is removed in the steps (e) and/or (f) described above of the process of the invention. The molding insert can by way of example be removed from the primary structure by thermal decomposition, evaporation, sublimation or solvent extraction, as required by the chemical nature of said insert. The removal of the molding insert can give, after the sintering in step (h), structured quartz glass moldings with macroscopic cavity structure. If the quartz glass molding does not require a complex structure, but instead requires low weight, this embodiment can be used to save not only time but also costs.

In step (g) of the process of the invention, at least one filler is optionally used to fill the porous secondary structure. The filler must have a suitable particle size, so that it can be introduced into the cavities of the porous secondary structure. The use of a filler for filling results in infilling, thus reducing the porosity of the secondary structure, and the brown part is therefore subject to less shrinkage during the subsequent sintering, i.e. in step (h), as described at a later stage below. The use of a filler for filling the porous secondary structure therefore serves for retention of shape after the sintering in step (h). If the intention is to introduce fillers into the porous secondary structure, this is cooled to room temperature, as described above, after the thermal treatment in step (f).

The filler is not subject to any restrictions in the invention. In a preferred embodiment of the process of the invention, the filler is selected from the group consisting of inorganic pigments, silicon-based precursors and titanium-based precursors.

When silicon-based precursors are used, the cavities produced in steps (e) and (f) of the process of the invention can be infilled with quartz glass. Similarly, titanium-based precursors can be introduced into the porous secondary structure; glasses finally obtained thus exhibit very little thermal expansion. Processes suitable for filling of the cavities are in principle any of those capable of introducing fillers into the porous secondary structure. Examples that may be mentioned here are gas-phase deposition, and also liquid infiltration. Here again, combination with sol-gel processes is possible.

Step (g) of the process of the invention can be used not only for infilling but also especially to modify the optical and/or mechanical and/or thermal properties of the final molding obtained after the sintering in step (h). By way of example, a color can be provided to the quartz glass molding by introducing metal salt solutions. In one embodiment of the process of the invention, inorganic pigments are therefore used as filler in step (g). Examples of inorganic pigments are inter alia gold(III) chloride $AuCl_3$ or chromium (III) nitrate $Cr(NO_3)_3$. Introduction of the inorganic pigments can by way of example be achieved via saturation of the porous secondary structure in an appropriate metal salt solution. The process in step (g) is not restricted in the invention to a single filler. By way of example, quartz glass precursors, i.e. silicon-based precursors, can be introduced into the porous secondary structure in a first step by gas-phase deposition, and inorganic pigments can be introduced by liquid infiltration in a second step.

The porous secondary structure is then subjected to sintering in step (h) of the process of the invention; the porous secondary structure is thus compacted to give the final molding. This is highly transparent, and no longer has any porous structure. The sintering procedure used here depends on the pretreatment in step (g). If by way of example thermally decomposable precursors are introduced into the porous secondary structure in said step, a multistage sintering process is required in step (h), so that before the actual sintering takes place the precursors introduced are first thermally decomposed. If this thermal decomposition of precursors optionally introduced into the porous secondary structure is required, the brown part is by way of example first pretreated for a period of from 0.5 to 5 hours at a temperature ranging from 100 to 600° C. The heating rate during this pretreatment is not subject to any particular restrictions. The actual sintering in step (h) typically takes place stepwise in the range from 700 to 1500° C., beginning with sintering at a temperature in the range from 700 to 1000° C. for a period of from 1 to 3 hours and then sintering at a temperature in the range from 1000 to 1500° C. for a period of from 1 to 2 hours. The heating rate here can be in the range from 2 to 15 K/min. By virtue of the low coefficient of thermal expansion, and also the high thermal shock resistance of quartz glass, it is possible to select a comparatively high heating rate here.

In contrast to the laser sintering processes known from the prior art, the sintering in the process of the invention is achieved via supply of heat. This is accordingly a thermal sintering process.

The process of the invention requires no application of pressure. This significantly reduces the requirements placed on apparatus for the process of the invention. The sintering in step (h) can indeed take place at a pressure below atmospheric pressure. In one embodiment of the process of the invention, the sintering takes place at a pressure of at most, or ≤, 0.1 mbar, preferably of at most, or ≤, 0.01 mbar, and particularly preferably of at most, or ≤, 0.0001 mbar. After sintering, the resultant final molding can be cooled to room temperature, and here again this can typically be achieved at a comparatively high cooling rate in the range from 2 to 6 K/min.

Figure 2:
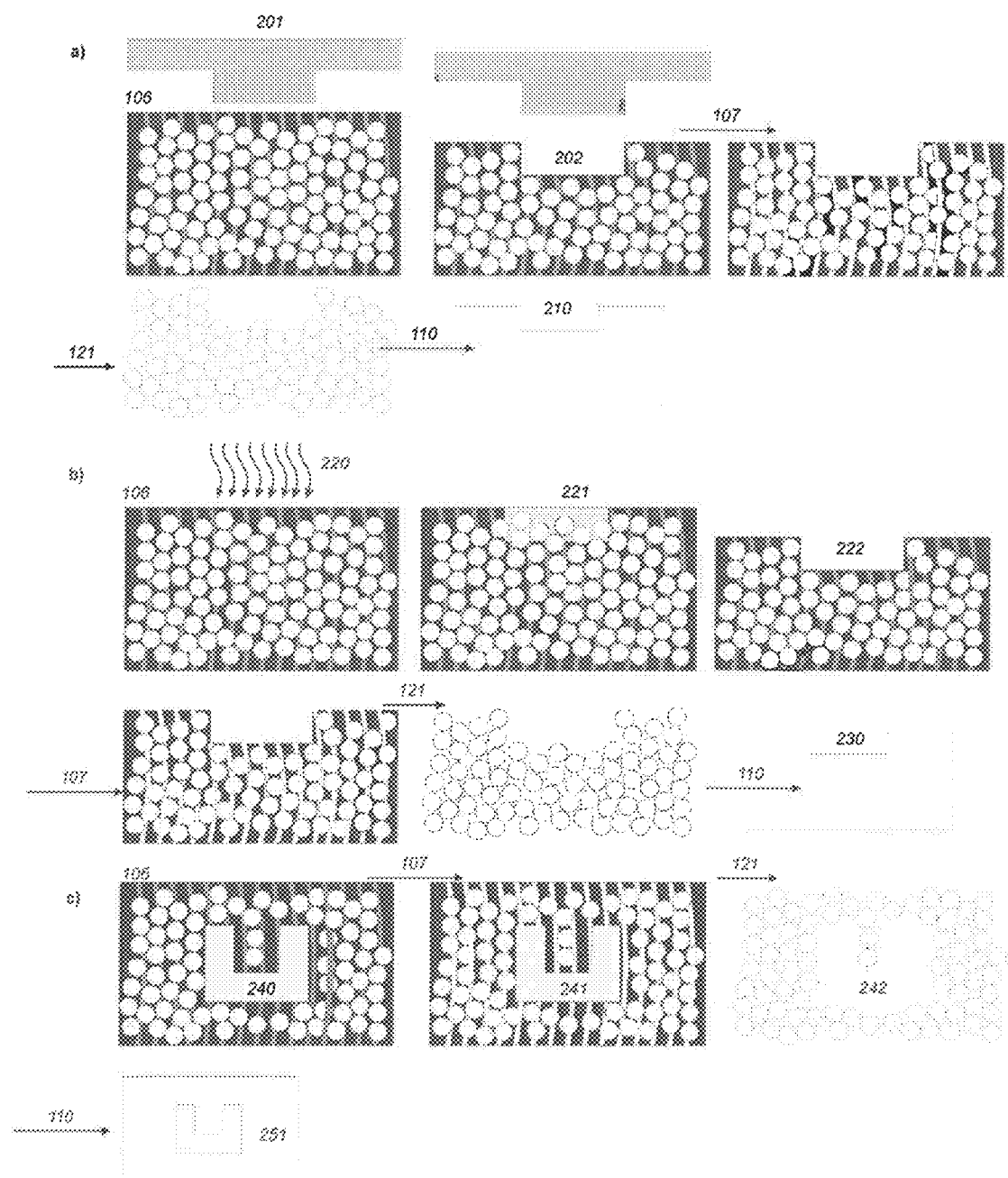
FIG. 2 presents diagrams of embodiments of the process of the invention: (a) "polymer replication" process modification: The green part (106) is optionally subjected to a thermal treatment and structured by means of a shaping implement (201); this causes the green part to assume the inverse structure (202) thereof. After removing (107) the non-hardenable component, debinding (121) and sintering (110) a structured quartz glass molding (210) is obtained; (b) "positive resist" process modification: High-energy radiation (220) is applied locally to the green part (106); the chemical and/or physical structure of the hardened organic binder is thus locally altered (221). After development (222) of the irradiated site, removing (107) the non-hardenable component, debinding (121) and sintering (110) a structured quartz glass molding (230) is obtained; (c) "lost form molding" process modification: Before the hardening of the at least one polymerizable organic binder to the green part, a molding insert made of a solid/liquid (240) not miscible with the organic binder is introduced into the organic binder. After the hardening procedure, the molding insert has therefore been enclosed within the green part (106). During removing (107) the non-hardenable component, or at the latest during debinding (121), the molding insert (241) is removed via decomposition, evaporation, sublimation or solvent extraction; a cavity (242) corresponding to the molding insert thus remains within the brown part. Sintering (110) gives a structured quartz glass molding (251) with precisely said cavity.
Figure 3:
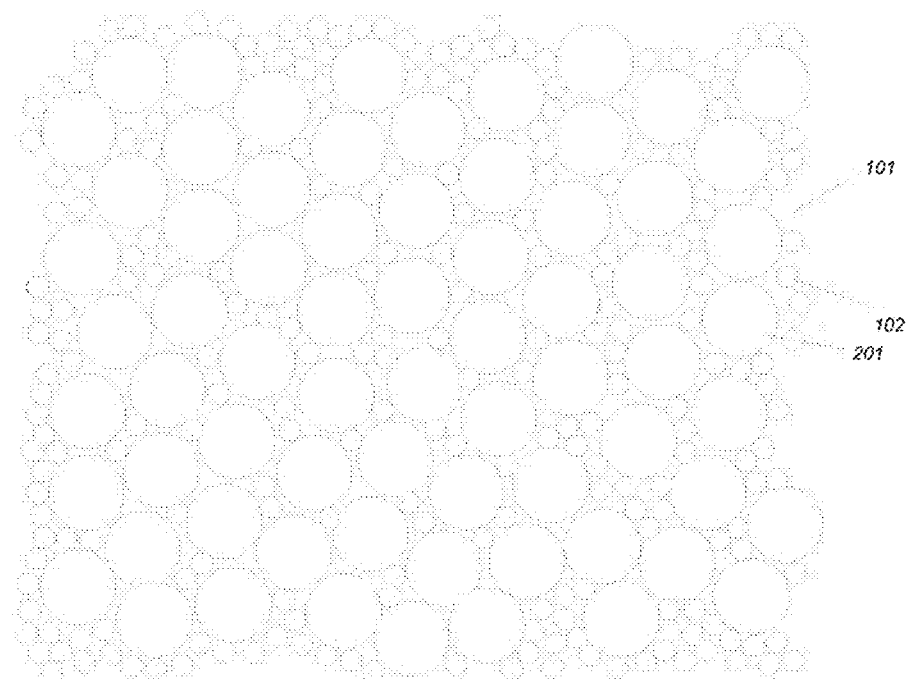
FIG. 3 shows an organic binder (101) in which there are two types of spherical quartz glass particles dispersed which differ significantly in their diameter. The quartz glass particles of the second type (201) here form cavities which the quartz glass particles of the first type (102) fill. Such compositions can be used to produce green parts with significantly increased fill level and therefore significantly increased density.

The process of the invention for the production of moldings made of high-purity transparent quartz glass, comprising the steps (a) to (h), is illustrated in FIG. 1. Other embodiments thereof are depicted in FIG. 2 and in FIG. 3.

Insofar as only silicon-based precursors are introduced into the cavities of the porous secondary structure in step (g), the chemical composition of the final molding obtained by the process of the invention is the same as that of conventionally manufactured quartz glasses. This is also true for the mechanical and optical properties of the molding. In particular, Vickers hardness, biaxial flexural strength, and also transmittance, are the same as the corresponding values for conventionally manufactured quartz glasses.

Another aspect of the invention provides a molding which is made of high-purity transparent quartz glass and which can be obtained by the process of the invention with use of the composition of the invention. The molding in the invention, made of high-purity transparent quartz glass, has the following properties:
- optical transmittance at least, or ≥, 70% at wavelength 200 nm, and also optical transmittance greater than, or >, 70% in the wavelength range from 200 to 1000 nm, at layer thickness 1 mm;
- Vickers hardness 799 HV, measured in accordance with DIN EN ISO 6507;
- and
- biaxial flexural strength 100 MPa, measured in accordance with DIN EN ISO 6872.

The process of the invention permits the controlled production of three-dimensional quartz glass structures with any desired shape by additive manufacturing, for example 3D printing, via repetition, at least once, of the steps (a) to (c) described above. In one embodiment of the present invention, the hardening of the at least one polymerizable organic binder present in the composition of the invention is achieved with spatial resolution via supply of light in step (b). This embodiment is comparable to a stereolithographic RP process that has hitherto been used only for the production of polymer components. However, in step (b) of the process of the invention it is possible in the same way to utilize any other RP process in which primary structuring is undertaken by means of irradiation. In another embodiment of the present invention, it is also possible to use a combined spotting process with subsequent irradiation, that is conventional in 3D printing.

It is therefore possible in the invention, through provision of a three-dimensional shape model in digital form, for example via CAD software, to produce moldings made of high-purity transparent quartz glass with any desired shape and with, resulting from the process, structural resolution comparable with that of polymer components.

The process of the invention, inclusive of the composition of the invention, can also be used in the same manner for the replication of moldings. In another embodiment of the present invention, the composition is provided in step (a) of the process of the invention in a device with rigid geometric shape, and the at least one polymerizable organic binder present in the composition is completely hardened in step (b) via supply of light or heat, preferably of heat.

The process of the invention is therefore firstly suitable for free shaping in three dimensions in an RP process, but can secondly also be used with very little change for the replication of a prescribed structure, and thus as a replicative process for the production of quartz glass moldings.

In particular, the process of the invention permits free shaping in three dimensions for structures made of quartz glass with high structural resolution and therefore low surface roughness. In contrast to the modified FDM process mentioned in the introduction, none of the thermal steps of the process of the invention serves for structuring. The latter is achieved solely by a lithographic method; high spatial resolution can thus be achieved. This is one of the reasons for significantly lower apparatus cost for the thermal treatment steps in the process of the invention in comparison with, for example, the selective laser sintering processes mentioned in the introduction, most of which must take place in a high-purity atmosphere or in vacuo.

In contrast to selective laser sintering, the process of the invention produces moldings with excellent optical, mechanical and structural properties. Because none of the thermal treatment steps serves for three-dimensional structuring, it is possible to replicate the surface quality of the original structure-provider on the final molding with hardly any distortion. If, by way of example, the structure-provider permits the production of reflective surfaces, the final molding likewise has reflective surfaces with high optical quality. This is a significant advantage in comparison with the modified FDM approach and selective laser sintering, both of which provide surfaces of low optical quality.

A further advantage of the process of the invention arises because all of the thermal treatment steps, for example the debinding and the sintering, can be carried out without external pressure. In particular, no additional application of pressure is necessary in order to produce moldings with adequate density and with high optical transmittance. The quartz glass moldings produced by the process of the invention can moreover be processed without additional fixing. The device used in step (a) is not subject to any specific requirements.

The process of the invention can moreover, as mentioned above, be combined with sol-gel approaches in order to achieve infilling of the porous secondary structure, and also optionally in order to achieve optical and/or mechanical and/or thermal modification. However, the actual core of the process, i.e. production of the primary structure, does not require the use of condensing precursors; moldings with significantly lower shrinkage and with greatly increased optical clarity and mechanical strength are therefore obtained. Because the core process is not altered, the traditional disadvantages of sol-gel approaches, i.e. shrinkage, and also low density of the final molding, do not arise in the process of the invention.

EXAMPLES

The examples below serve for further explanation of the present invention, with no restriction thereto.

Example 1

A composition comprising the following components was provided in a 50 mL glass beaker:
- 8.25 mL of hydroxyethyl methacrylate and 3 mL of tetraethylene glycol dimethacrylate as polymerizable organic binders;
- 3.75 mL of phenoxyethanol as non-hardenable component;
- 0.6 g of 2,2-dimethoxy-2-phenylacetophenone as light-activatable free-radical initiator;
- 6 mg of Sudan Orange G as absorber; and
- 25 g of quartz glass particles with diameter in the range from 10 to 100 nm; average diameter here was 40 nm.

The composition was a pale yellow, high-viscosity suspension, with viscosity about 2.82 Pa·s at shear rate 100 s$^{-1}$ and temperature 20° C.

In the following step, the composition was structured in a conventional RP system (Asiga Pico 2, a stereolithography system, obtainable from Asiga) with use of a suitable 3D model via supply of UV light having a wavelength of 385 nm. The structuring resulted in the primary shaping of the green part.

The green part was then subjected to a multistage thermal treatment with the following temperature profile:

| | | | |
|---|---|---|---|
| Heating rate: 0.5 K/min, | 25° C. → | 150° C., | retention time: 4 h |
| Heating rate: 0.5 K/min, | 150° C. → | 280° C., | retention time: 4 h |
| Heating rate: 1 K/min, | 280° C. → | 550° C., | retention time: 2 h |
| Cooling rate: 5 K/min, | 550° C. → | 25° C., | End |

The first thermal treatment step here served for removing the non-hardenable component contained in the green part, while, via the second and third thermal treatment step, the green part was debound, i.e. the hardened organic binder matrix was removed.

In the following step, the resultant brown part was sintered in vacuo at a pressure of about 0.1 mbar; the brown part was thus compacted, and the final molding was obtained. The temperature profile during sintering here was as follows:

| | | | |
|---|---|---|---|
| Heating rate: 5 K/min, | 25° C. → | 800° C., | retention time: 2 h |
| Heating rate: 3 K/min, | 800° C. → | 1300° C., | retention time: 1.5 h |
| Cooling rate: 5 K/min, | 1300° C. → | 25° C., | End |

Figure 4:
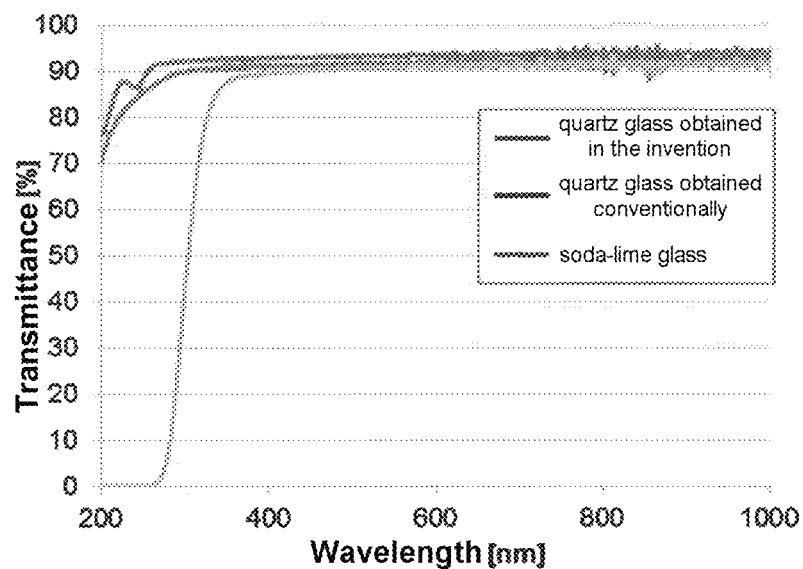
FIG. 4 shows the optical transmittance of the quartz glass molding obtained in example 1 after sintering in comparison with conventionally obtained quartz glass and soda-lime glass.

After conclusion of the above temperature program, the molding exhibited minimal optical transmittance of 72% at wavelength 200 nm and optical transmittance greater than 72% in the wavelength range from 200 to 1000 nm. The layer thickness of the molding for the transmittance measurements was 1 mm. The molding therefore exhibited optical transparency no different from that of conventional quartz glass (FIG. 4). The measurements were made using an Evolution 201 UV/VIS spectrometer (Thermo Scientific, Germany), operated in transmittance mode.

The Vickers hardness of the molding was moreover 799 HV, measured in accordance with DIN EN ISO 6507 (system: Fischerscope HV 100, Helmut Fischer GmbH, Germany), and its biaxial flexural strength was 100 MPa, measured in accordance with DIN EN ISO 6872 (system: 10T, UTS, Germany). The molding was therefore also no different in respect of its mechanical properties from conventionally obtained pure quartz glass, for which Vickers hardness 799 HV and biaxial flexural strength 100 MPa are likewise usual.

Example 2: Filling of the Porous Secondary Structure with Inorganic Pigments

Figure 5:
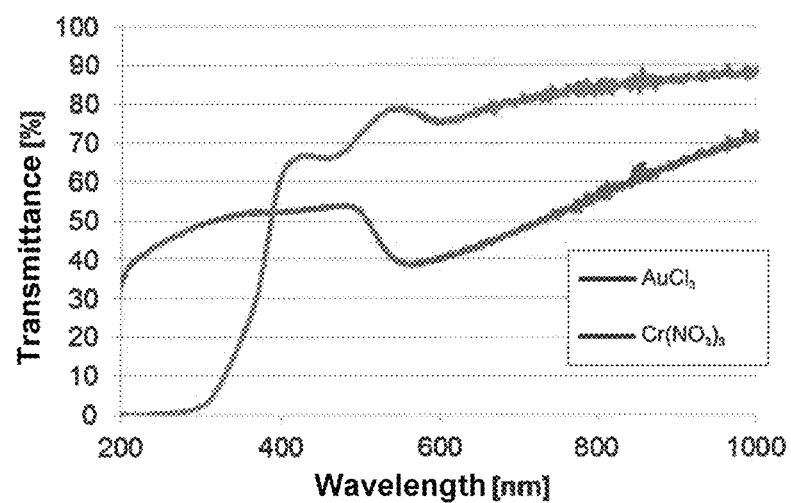
FIG. 5 shows the optical transmittance of the colored quartz glass molding obtained in example 2 via saturation of the brown part.

A brown part was obtained under conditions the same as those in example 1. Filling the cavities present in the brown part with gold(III) chloride gave a colloidal red coloration, while filling with chromium(III) nitrate led to an ionic green coloration. For this purpose, the brown part was saturated in an ethanolic solution with 0.1% by mass of $AuCl_3$ and correspondingly, 0.5% by mass of $Cr(NO_3)_3$, and then dried at 50° C. for 1 hour. Sintering was achieved with the temperature profile from example 1 under nitrogen at a pressure of about 0.1 mbar. The quartz glass moldings obtained after sintering were in each case colored; this is also apparent in the transmission spectra (FIG. 5).

Figure 6:
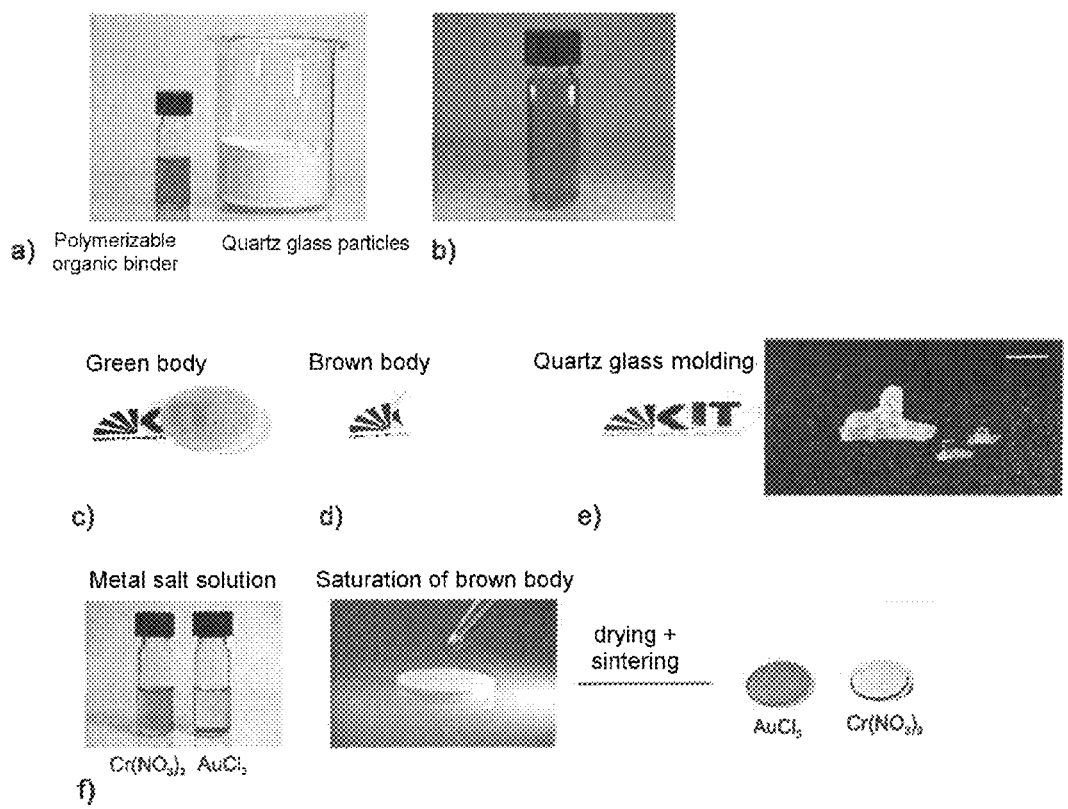
FIG. 6 shows the production of the quartz glass molding by the process of the invention, starting from the composition of the invention: (a) the organic binder, and also the quartz glass particles, (b) the suspension obtained therefrom with quartz glass particles dispersed in the organic binder, (c) the green part, (d) the brown part, (e) the final quartz glass molding (scale: 5 mm) from example 1, and also (f) the filling of the cavities of the brown part for the production of the colored quartz glass molding from example 2.

FIG. 6 shows the production of the quartz glass molding by the process of the invention, starting from the composition of the invention, as described in examples 1 and 2.

Example 3: "Polymer Replication" Process Modification

A composition comprising the following components was charged to a 50 mL glass beaker:
  12.8 mL of hydroxyethyl methacrylate as polymerizable organic binder;
  4.3 mL of phenoxyethanol as non-hardenable component;
  0.6 g of 2,2-dimethoxy-2-phenylacetophenone as light-activatable free-radical initiator;
  25 g of quartz glass particles with diameter in the range from 10 to 100 nm; average diameter here was 40 nm.

Figure 7:
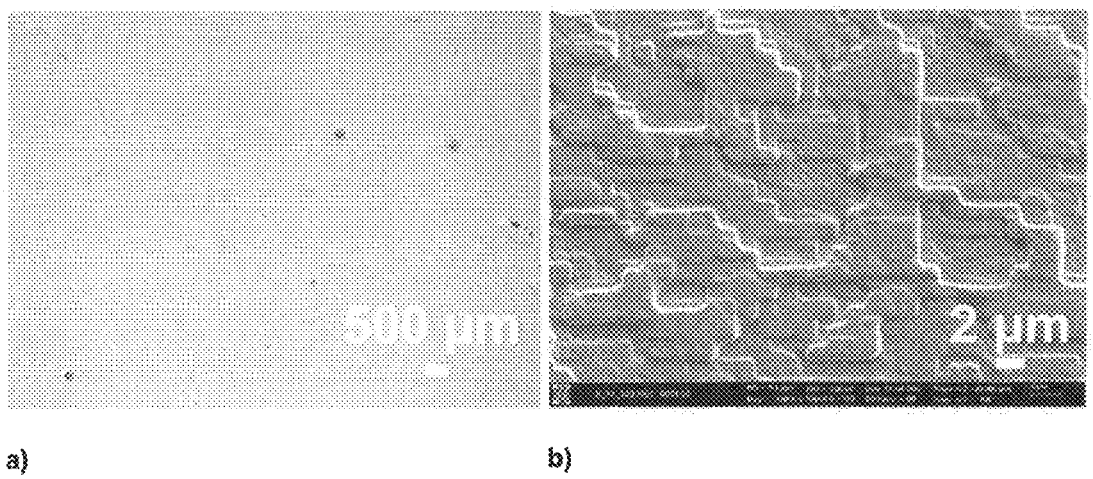
FIG. 7 shows the result of the "polymer replication" process modification used in example 3: (a) the green part, which has been structured by means of a shaping implement (nanoimprint system), and (b) the structured quartz glass molding obtained from said green part after conclusion of the process of the invention. (a) is an optical micrograph, while (b) is a scanning electron micrograph.

The above composition was hardened via supply of UV light at a wavelength of 365 nm. The resultant thermoplastic green part was imprinted by means of a conventional nanoimprint system (EVG HE510, obtainable from EVG) at a temperature of 70° C. with an imprint force of 1000 N and a retention time of 5 minutes. Removing the non-hardenable component, debinding the green part, and sintering the brown part were carried out according to the temperature profile from example 1, as described above. FIG. 7 depicts the structuring brought about by the forming tool installed in the nanoimprint system, both for the green part and for the final quartz glass molding.

What is claimed is:

1. A composition for the production of a molding made of high-purity transparent quartz glass, comprising the following components:
  at least one polymerizable organic binder which at room temperature is present in liquid form;
  a polymerization initiator or crosslinking agent, respectively, which, via supply of light or heat, initiates the polymerization or crosslinking of the at least one polymerizable organic binder; and
  at least one type of spherical quartz glass particles, which are present in dispersed form in the at least one polymerizable organic binder and have a diameter ranging from 7 to 100 nm.

2. The composition as claimed in claim 1, wherein the at least one polymerizable organic binder is a monoacrylate and/or a diacrylate.

3. The composition as claimed in claim 1, further comprising a non-hardenable component, which at room temperature is present in solid or in viscous liquid form.

4. The composition as claimed in claim 1, further comprising at least one second type of spherical quartz glass particles having a diameter ranging from 2 to 40 μm.

5. A process for the production of a molding made of high-purity transparent quartz glass, the process comprising the following steps:
  (a) providing the composition as claimed in claim 1 in a device;
  (b) hardening the at least one polymerizable organic binder contained in the composition via supply of light or heat, whereby a green part is obtained as a primary structure;
  (c) separating potentially non-hardened at least one polymerizable organic binder, inclusive of the components contained therein, from the primary structure; and optionally at least once repeating the steps (a), (b) and optionally (c);
  (d) optionally post-treating the primary structure by at least one process selected from the group consisting of structuring by means of a forming tool, irradiating with high-energy radiation and subsequent developing, milling, drilling, laminating, bonding, grinding, polishing, lapping, engraving and treating with heat or laser light;

(e) removing a non-hardenable component potentially present in the primary structure;

(f) debinding the primary structure by thermal treatment, whereby a brown part is obtained as porous secondary structure;

(g) optionally filling up the porous secondary structure with at least one filler; and (h) sintering the porous secondary structure, whereby the molding is obtained.

6. The process as claimed in claim 5, wherein removing the non-hardenable component if present in the primary structure in step (e) is carried out by thermal treatment at a temperature ranging from 50 to 300° C., by applying a reduced pressure or by solvent extraction.

7. The process as claimed in claim 5, wherein debinding the primary structure in step (f) is carried out at a temperature ranging from 200 to 700° C.

8. The process as claimed in claim 5, wherein sintering the porous secondary structure in step (h) is carried out at a temperature ranging from 700 to 1500° C. and at a pressure of at most 0.1 mbar.

9. The process as claimed in claim 5, wherein the at least one filler in step (g) is selected from the group consisting of inorganic pigments, silicon-based precursors and titanium-based precursors.

10. The process as claimed in claim 5, wherein the at least one polymerizable organic binder is a monoacrylate and/or a diacrylate.

11. The process as claimed in claim 5, wherein the non-hardenable component, if present, exists in solid or in viscous liquid form at room temperature.

12. A molding made of high-purity transparent quartz glass, obtainable by the process as claimed in claim 5.

13. The process as claimed in claim 5, wherein the composition further comprises at least one second type of spherical quartz glass particles having a diameter ranging from 2 to 40 μm.

14. A process for the production of a molding made of high-purity transparent quartz glass, the process comprising the following steps:

(a) providing the composition for the production of a molding made of high-purity transparent quartz glass in a device, the composition comprising:
at least one polymerizable organic binder which at room temperature is present in liquid form;
a polymerization initiator or crosslinking agent, respectively, which, via supply of light or heat, initiates the polymerization or crosslinking of the at least one polymerizable organic binder;
at least one type of spherical quartz glass particles, which are present in dispersed form in the at least one polymerizable organic binder and have a diameter ranging from 7 to 100 nm; and
an optional non-hardening component;

(b) incompletely hardening the at least one polymerizable organic binder contained in the composition via supply of light or heat, whereby a green part is obtained as a primary structure;

(c) separating non-hardened at least one polymerizable organic binder, inclusive of the components contained therein, from the primary structure; and optionally at least once repeating the steps (a), (b) and (c);

(d) optionally post-treating the primary structure by at least one process selected from the group consisting of structuring by means of a forming tool, irradiating with high-energy radiation and subsequent developing, milling, drilling, laminating, bonding, grinding, polishing, lapping, engraving and treating with heat or laser light;

(e) removing the non-hardenable component if present in the primary structure;

(f) debinding the primary structure by thermal treatment, whereby a brown part is obtained as a porous secondary structure;

(g) optionally filling up the porous secondary structure with at least one filler; and (h) sintering the porous secondary structure, whereby the molding is obtained.

15. The process as claimed in claim 14, wherein removing the non-hardenable component if present in the primary structure in step (e) is carried out by thermal treatment at a temperature ranging from 50 to 300° C., by applying a reduced pressure or by solvent extraction.

16. The process as claimed in claim 14, wherein debinding the primary structure in step (f) is carried out at a temperature ranging from 200 to 700° C.

17. The process as claimed in claim 14, wherein sintering the porous secondary structure in step (h) is carried out at a temperature ranging from 700 to 1500° C. and at a pressure of at most 0.1 mbar.

18. The process as claimed in claim 14, wherein the at least one filler in step (g) is selected from the group consisting of inorganic pigments, silicon-based precursors and titanium-based precursors.

19. The process as claimed in claim 14, wherein the at least one polymerizable organic binder is a monoacrylate and/or a diacrylate.

20. The process as claimed in claim 14, wherein the non-hardenable component, if present, exists in solid or in viscous liquid form at room temperature.

* * * * *